United States Patent
Boswell et al.

(10) Patent No.: US 9,558,163 B1
(45) Date of Patent: *Jan. 31, 2017

(54) METHOD FOR ACCELERATED WEBPAGE DEVELOPMENT FOR AT LEAST ONE MOBILE COMPUTING DEVICE

(71) Applicant: INFORMATION CAPITAL EXECUTIVE MANAGEMENT, INC., Austin, TX (US)

(72) Inventors: Michael Boswell, Brentwood, TN (US); Webb Braughton, Nashville, TN (US); Michael Bowien, White House, TN (US); Ethan Crawford, San Angelo, TX (US); Eric Means, Nashville, TN (US)

(73) Assignee: INFORMATION CAPITAL EXECUTIVE MANAGEMENT, INC., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/246,067

(22) Filed: Aug. 24, 2016

Related U.S. Application Data

(63) Continuation-in-part of application No. 14/976,076, filed on Dec. 21, 2015.

(60) Provisional application No. 62/203,350, filed on Aug. 10, 2015.

(51) Int. Cl.
| | | |
|---|---|---|
| *G06F 17/22* | (2006.01) | |
| *G06F 17/21* | (2006.01) | |
| *G06F 17/24* | (2006.01) | |
| *H04L 29/06* | (2006.01) | |
| *H04W 12/08* | (2009.01) | |
| *H04W 12/10* | (2009.01) | |
| *G06F 3/0485* | (2013.01) | |

(52) U.S. Cl.
CPC ......... *G06F 17/2247* (2013.01); *G06F 17/211* (2013.01); *G06F 17/2205* (2013.01); *G06F 17/243* (2013.01); *G06F 17/248* (2013.01); *H04L 63/10* (2013.01); *H04L 63/123* (2013.01); *H04W 12/08* (2013.01); *H04W 12/10* (2013.01); *G06F 3/0485* (2013.01)

(58) Field of Classification Search
None
See application file for complete search history.

(56) References Cited

U.S. PATENT DOCUMENTS

| | | |
|---|---|---|
| 2005/0102284 A1 | 5/2005 | Srinivasan |
| 2009/0119329 A1 | 5/2009 | Kwon |
| 2010/0299586 A1 | 11/2010 | Yoo |
| 2011/0154187 A1 | 6/2011 | Sadowski |
| 2013/0097279 A1 | 4/2013 | Polis |
| 2013/0198619 A1 | 8/2013 | Sidhu |

(Continued)

*Primary Examiner* — Matt Kim
*Assistant Examiner* — David Luu
(74) *Attorney, Agent, or Firm* — Buskop Law Group, PC; Wendy Buskop

(57) ABSTRACT

A method for accelerated developing of mobile device specific webpages using a hypertext generator and a domain free interface traverser to collect predefined data from one or more third party servers, store the collected data, and maintain consistency throughout with a plurality of rules for a consistent look and feel. A replication step verifies consistence of predefined data. The method includes use of a document processor to merge predefined data into a webpage document template creating a mobile device specific webpage by one or more untrained webpage developers and generate a consistent look.

17 Claims, 8 Drawing Sheets

(56) References Cited

U.S. PATENT DOCUMENTS

| | | |
|---|---|---|
| 2014/0075283 A1 | 3/2014 | Coursol |
| 2014/0222553 A1 | 8/2014 | Bowman |
| 2014/0365256 A1 | 12/2014 | Duff |
| 2015/0026304 A1 | 1/2015 | Mukherjee |
| 2015/0040098 A1 | 2/2015 | Akins |
| 2015/0248337 A1 | 9/2015 | Adler |

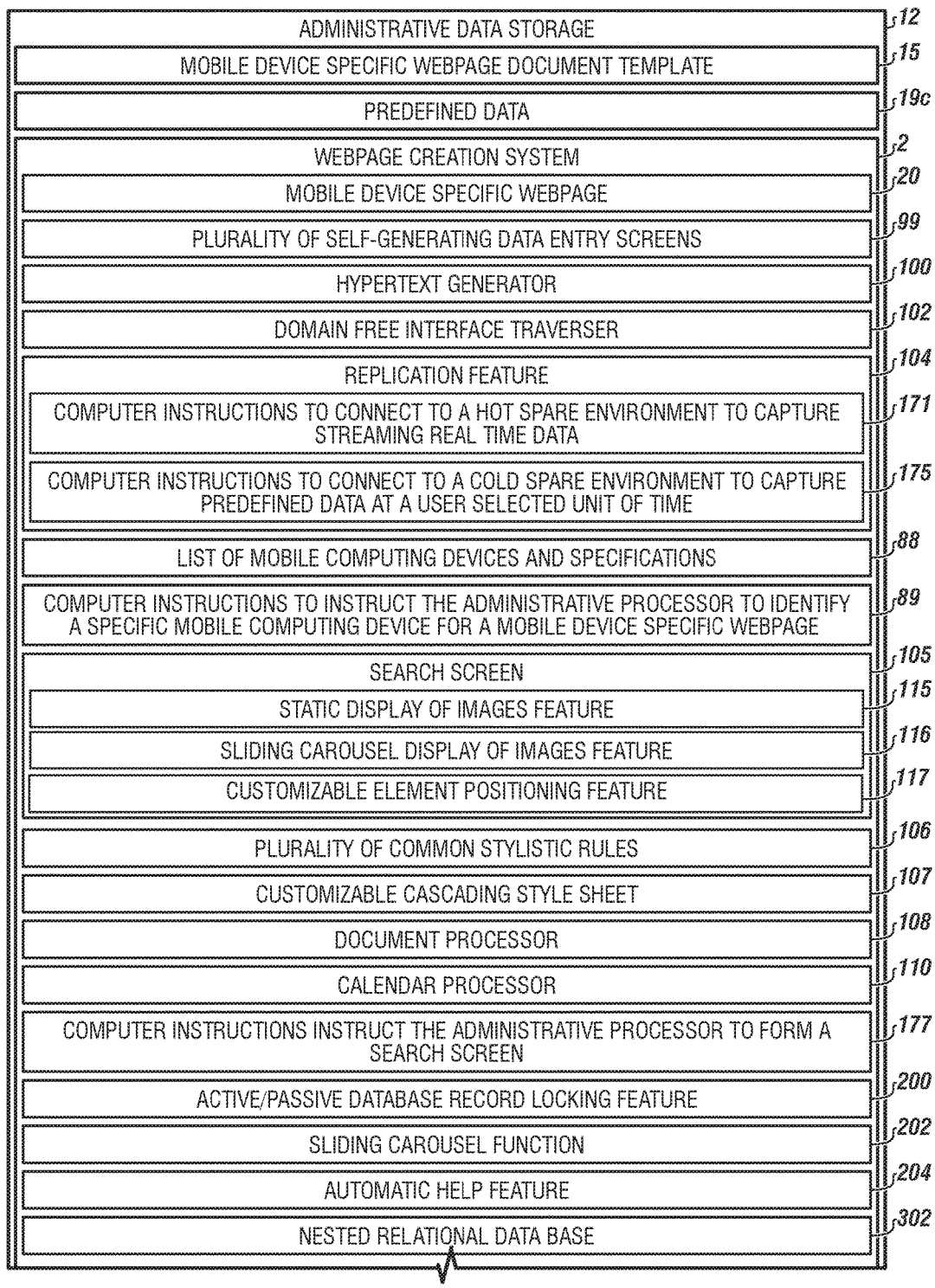

FIGURE 5

TAX BILL
NOTICE AND DEMAND FOR PAYMENT OF TAX DUE

12/15/2015

| | | |
|---|---|---|
| REAL OR PERSONAL PROPERTY PARCEL NUMBER: | 1234 | 202 |
| ADDRESS 1: | 123 SIMPLE STREET | 204 |
| ADDRESS 2: | SUITE 12 | 206 |
| CITY: | AUSTIN | 208 |
| STATE: | TEXAS | 210 |
| ZIP CODE: | 78701 | 212 |

YOU RECEIVED THIS BILL BECAUSE:
- WE HAVE RECOMPUTED YOUR TAX LIABILITY AND FOUND THAT YOU OWE TAX.

| | |
|---|---|
| TAX: | $1,234.00 |
| INTEREST: | $15.43 |
| PENALTY: | $10.00 |
| TOTAL AMOUNT DUE IF PAID BY 01/01/2016: | $1,259.43 |

HOW TO PAY:
- ONLINE: THE EASIEST WAY TO PAY.
-- GO TO WWW.TAX.XX.GOV AND FOLLOW THE PROMPTS FOR MAKING AN ONLINE PAYMENT
- PHONE: CALL (123) 456-7890
- MAIL: USE THE COUPON BELOW AND THE ENCLOSED ENVELOPE.

IF YOU DON'T PAY BY 01/01/2016:
- WE WILL IMPOSE ADDITIONAL INTEREST AND PENALTIES ON YOU.
- WE MAY BEGIN COLLECTION ACTIONS AGAINST YOU.

TAX BILL                              PAY BY 01/01/2016

| REAL OR PERSONAL PROPERTY PARCEL NUMBER: | TOTAL AMOUNT DUE: | AMOUNT PAID: |
|---|---|---|
| 1234 | $1,259.43 | $ |
| | | $ |
| | | $ |
| | | $ |
| | TOTAL AMOUNT PAID: | $ |

FIGURE 6A

| | |
|---|---|
| FORMING A PLURALITY OF DATA ENTRY SCREEN DEFINITIONS FOR A MOBILE DEVICE SPECIFIC WEBPAGE USING AN ADMINISTRATIVE PROCESSOR AND STORING THE DATE ENTRY SCREEN DEFINITIONS IN AN ADMINISTRATIVE DATA STORAGE | 500 |
| GENERATING A LIST OF MOBILE COMPUTING DEVICES AND SPECIFICATIONS FOR DISPLAYING A CREATED MOBILE DEVICE SPECIFIC WEBPAGE AND STORING THE LIST IN THE ADMINISTRATIVE DATA STORAGE | 510 |
| IDENTIFYING A SPECIFIC MOBILE COMPUTING DEVICE FOR THE MOBILE DEVICE SPECIFIC WEBPAGE FROM THE LIST OF MOBILE COMPUTING DEVICES | 520 |
| AUTOMATICALLY GENERATING DATA ENTRY SCREENS FOR ENTERING AND STORING PREDEFINED DATA FOR USE ON THE MOBILE DEVICE SPECIFIC WEBPAGE AND STORING THE GENERATED DATA ENTRY SCREENS IN THE ADMINISTRATIVE DATA STORAGE | 530 |
| AUTOMATICALLY GENERATING HYPERTEXT FOR THE MOBILE DEVICE SPECIFIC WEBPAGE USING THE PREDEFINED DATA | 540 |
| BI-DIRECTIONALLY CONTROLLING COMMUNICATION, DATA DELIVERY AND ACCESS PERMISSION, TO AND FROM ONE OR MORE THIRD PARTY SERVERS CONNECTED TO THE NETWORK TO AUTOMATICALLY COLLECT, STORE AND MAINTAIN DATA INTEGRITY OF DATA PROCESSED THROUGH EACH THIRD PARTY SERVER AND MAINTAIN CONSISTENCY OF THE PREDEFINED DATA COLLECTED FROM THE ONE OR MORE THIRD PARTY SERVERS USING THE NETWORK, COLLECTING THE PREDEFINED DATA VIA THE MOBILE SPECIFIC WEBPAGE FROM THE ONE OR MORE THIRD PARTY SERVERS ON THE NETWORK, AND UPDATING THE PREDEFINED DATA VIA THE MOBILE DEVICE SPECIFIC WEBPAGE TO THE ONE OR MORE THIRD PARTY SERVERS ON THE NETWORK SIMULTANEOUSLY | 550 |
| SIMULTANEOUSLY DUPLICATING THE PREDEFINED DATA TO A HOT SPARE ENVIRONMENT AND A COLD SPARE ENVIRONMENT WHILE MAINTAINING INTEGRITY OF THE PREDEFINED DATA PREVENTING LOSS OF THE PREDEFINED DATA | 560 |
| ENFORCING A COMMON STYLISTIC LOOK AND FEEL FOR USE ON THE MOBILE DEVICE SPECIFIC WEBPAGE AND MAINTAINING CONSISTENCY BETWEEN ADDITIONALLY DEVELOPED MOBILE DEVICE SPECIFIC WEBPAGES FOR THE SPECIFIC MOBILE COMPUTING DEVICE USING A PLURALITY OF COMMON STYLISTIC RULES | 570 |
| MERGING THE PREDEFINED DATA INTO THE MOBILE DEVICE SPECIFIC WEBPAGE DOCUMENT TEMPLATE AUTOMATICALLY AND GENERATING THE MOBILE DEVICE SPECIFIC WEBPAGE WHILE STORING THE GENERATED MOBILE DEVICE SPECIFIC WEBPAGE IN THE ADMINISTRATIVE DATA STORAGE ENABLING A USER OR A NON-AMINISTRATIVE USER TO CREATE THE MOBILE DEVICE FILLED WITH PREDEFINED DATA WITH SELF-GENERATING DATA ENTRY SCREEN DEFINITIONS USING THE PLURALITY OF COMMON STYLISTIC RULES | 580 |
| TRANSMITTING THE GENERATED MOBILE DEVICE SPECIFIC WEBPAGE VIA THE NETWORK FOR DISPLAY ON THE SPECIFIC MOBILE COMPUTING DEVICE | 590 |
| PRODUCING A CALENDAR ON THE MOBILE DEVICE SPECIFIC WEBPAGE | 600 |
| INSTALLING A NESTED RELATIONAL DATABASE IN THE ADMINISTRATIVE DATA STORAGE FOR ACCESS BY THE ADMINISTRATIVE PROCESSOR FOR DEVELOPING THE MOBILE DEVICE SPECIFIC WEBPAGE FOR THE AT LEAST ONE MOBILE COMPUTING DEVICE | 602 |

(6B)

(6A)

| | |
|---|---|
| INSTALLING AN OPERATING SYSTEM IN THE ADMINISTRATIVE DATA STORAGE FOR ACCESS BY THE ADMINISTRATIVE PROCESSOR FOR DEVELOPING THE MOBILE DEVICE SPECIFIC WEBPAGE FOR THE AT LEAST ONE MOBILE COMPUTING DEVICE | 604 |
| INSTALLING A DEVELOPER USER PROFILE IN THE ADMINISTRATIVE DATA STORAGE FOR ACCESS BY THE ADMINISTRATIVE PROCESSOR FOR DEVELOPING THE MOBILE DEVICE SPECIFIC WEBPAGE FOR THE AT LEAST ONE MOBILE COMPUTING DEVICE | 606 |
| INSTALLING A TRANSFER MECHANISM IN THE ADMINISTRATIVE DATA STORAGE FOR ACCESS BY THE ADMINISTRATIVE PROCESSOR ENABLING TRANSFER OF THE MOBILE DEVICE SPECIFIC WEBPAGE TO ANOTHER ADMINISTRATIVE PROCESSOR CONNECTED TO THE NETWORK USING THE DEVELOPER USER PROFILE OR A USER PROFILE OF A NON-ADMINISTRATIVE USER | 608 |
| INSTALLING AN ACTIVE/PASSIVE DATABASE RECORD LOCKING FEATURE IN THE ADMINISTRATIVE DATA STORAGE FOR INSTRUCTING THE ADMINISTRATIVE PROCESSOR TO CONTROL ACCESS TO MODIFY THE PREDEFINED DATA TO MAINTAIN PREDEFINED DATA INTEGRITY | 610 |
| CONTROLLING A VIEWING OF MULTIPLE IMAGES SIMULTANEOUSLY ON THE MOBILE DEVICE SPECIFIC WEBPAGE GENERATED BY THE WEBPAGE CREATION METHOD FOR THE AT LEAST ONE MOBILE COMPUTING DEVICE IN A COMPACT SEQUENTIALLY SCROLLING DISPLAY | 612 |
| PROVIDING AN AID TO A MOBILE DEVICE SPECIFIC WEBPAGE CREATOR, ENABLING A NON-ADMINISTRATIVE USER OF THE AT LEAST ONE MOBILE COMPUTING DEVICE TO OPERATE A POINTER TO TOUCH OR LINK TO AN ELEMENT ON THE MOBILE DEVICE SPECIFIC WEBPAGE, EXTRACT THE PREDEFINED DATA, AND DISPLAY THE PREDEFINED DATA IN A HELP BUBBLE ON THE MOBILE DEVICE SPECIFIC WEBPAGE OF THE AT LEAST ONE MOBILE COMPUTING DEVICE | 614 |
| PRESENTING A SEARCH SCREEN CONFIGURED WITH A LOOK AND FEEL IDENTICAL TO AT LEAST ONE OF THE PLURALITY OF SELF-GENERATING DATA ENTRY SCREENS, BY PROVIDING A STATIC DISPLAY OF IMAGES FEATURE; AND A SLIDING CAROUSEL DISPLAY OF IMAGES FEATURE | 616 |
| USING A CUSTOMIZABLE CASCADING STYLE SHEET IN THE ADMINISTRATIVE DATA STORAGE FOR USE WITH THE PLURALITY OF COMMON STYLISTIC RULES | 618 |
| INSTALLING A DYNAMIC INFORMATION FRAME CONFIGURED AS A WEB WINDOW WITHIN A WEB WINDOW, WHERIN EACH WEB WINDOW CAN CONTAIN DIFFERENT SELF-GENERATED DATA ENTRY SCREENS | 620 |
| INSTALLING A PORTABLE DOCUMENT FORMAT REPORT TEMPLATE FOR AUTOMATIC POPULATION OF THE PREDEFINED DATA INTO THE PORTABLE DOCUMENT FORMAT REPORT TEMPLATE AUTOMATICALLY PRODUCING A PORTABLE DOCUMENT FORMAT REPORT COMPRISING INFORMATION AND ELEMENTS | 622 |
| USING A HYPERTEXT GENERATOR WITH THE PLURALITY OF DATA ENTRY SCREEN DEFINITIONS TO GENERATE A PLURALITY OF SELF-GENERATING DATA ENTRY SCREENS WITH THE PREDEFINED DATA | 624 |

*FIGURE 6B*

METHOD FOR ACCELERATED WEBPAGE DEVELOPMENT FOR AT LEAST ONE MOBILE COMPUTING DEVICE

CROSS REFERENCE TO RELATED APPLICATIONS

The present application is a Continuation in Part of co-pending application U.S. patent application Ser. No. 14/976,076 filed on Dec. 21, 2015, entitled "WEBPAGE CREATION TOOL FOR ACCELERATED WEBPAGE DEVELOPMENT FOR AT LEAST ONE MOBILE COMPUTING DEVICE", which claims priority to and the benefit of U.S. Provisional Patent Application Ser. No. 62/203,350 filed on Aug. 10, 2015, entitled "WEBPAGE DEVELOPER TOOL FOR ACCELERATED WEBPAGE DEVELOPMENT FOR MOBILE COMPUTING DEVICES". These references are herein incorporated in their entirety.

FIELD

The embodiments generally relate to a method for accelerated webpage development for at least one mobile computing device.

BACKGROUND

A need exists for an easy to implement method that enables an unskilled developer to develop webpages for mobile computing devices quickly and easily using data-entry screens to carry out a wide variety of searches and acquire a wide variety of extraction subsets of data without knowledge or skill in generating HTML.

A need exists for an easy to use method that quickly and efficiently allows a webpage developer to create mobile device webpages without the need to learn a computing language or have knowledge of computer programming.

The present embodiments meet these needs.

BRIEF DESCRIPTION OF THE DRAWINGS

The detailed description will be better understood in conjunction with the accompanying drawings as follows:

FIGS. 2A and 2B depicts an administrative data storage usable with the method according to one or more embodiments.

FIG. 5 is an exemplary filled in portable document format report template according to one or more embodiments.

FIGS. 6A and 6B depicts a method according to one or more embodiments.

Figure 1:
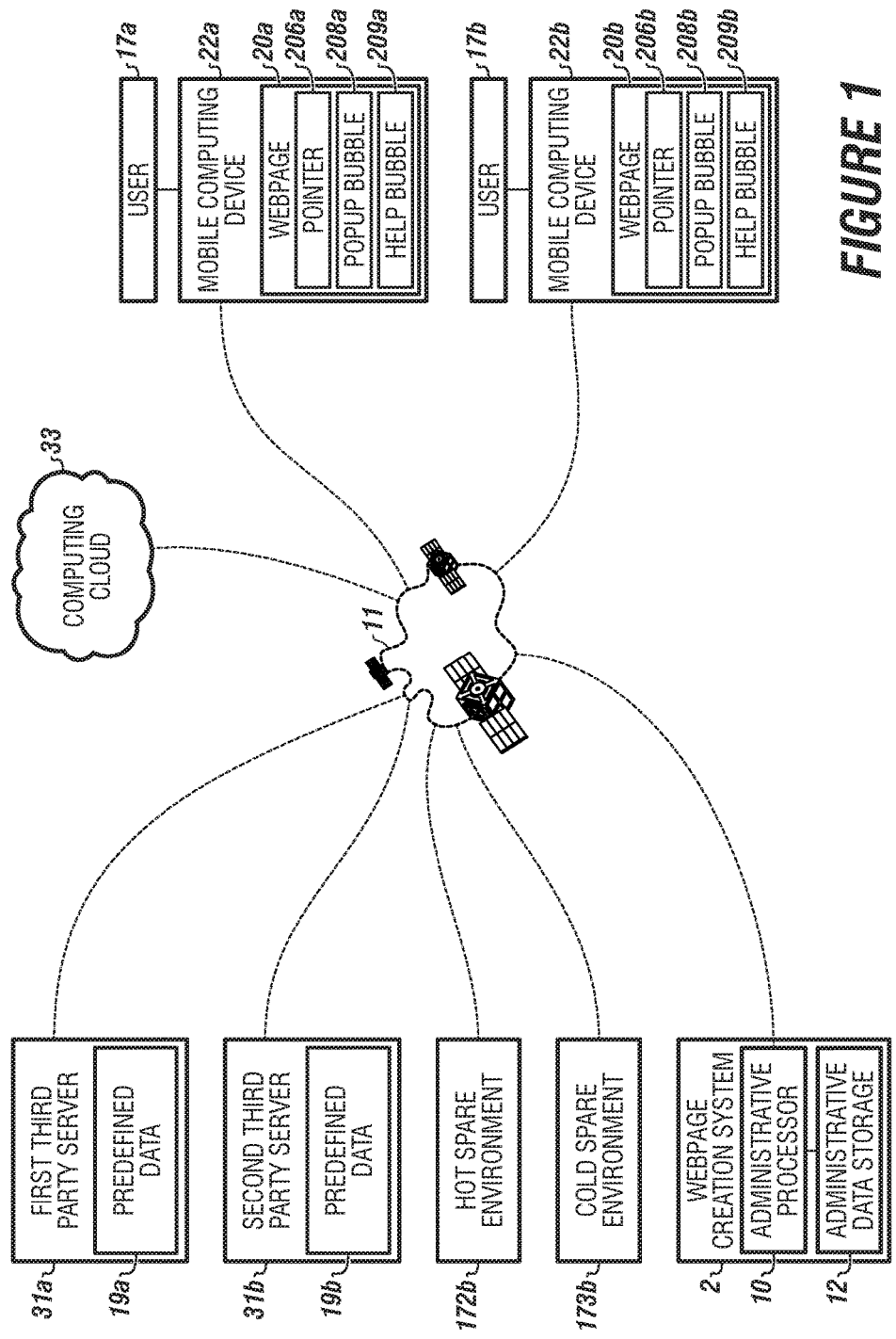
FIG. 1 depicts an overview of components usable with the method according to one or more embodiments.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The embodiments generally relate to a method for accelerated creation of webpages usable on at least one mobile computing device.

The embodiments further relate to a method that enables an unskilled webpage developer to develop mobile device specific webpages quickly and easily using data-entry screens and a wide variety of search and extraction subsets.

A benefit is that the method can be faster for mobile device specific website creation than current commercial methods.

Another benefit of the method is that a webpage creator does not need to know the details of programming languages, such as HTML and can still generate webpages for mobile computing devices.

Embodiments of the method minimize the amount of programming language a webpage creator needs to know to create a usable webpage specific for at least one mobile computer device or multiple mobile computing devices.

The embodiments can automatically and continuously, 24 hours a day 7 days a week, verify and authenticate data obtained from multiple third party servers, simultaneously.

The embodiments can standardize the look and feel of the webpage between an identified group of developers using standardized rules and protocols.

The embodiments can allow access to predefined data from multiple third party servers simultaneously and seamlessly.

The embodiments generally relate to a method for developing webpages specifically for at least one mobile computer device or multiple mobile computing devices.

The method can use a hypertext generator and a domain free interface traverser to simultaneously: collect predefined data from different third party servers, store the collected predefined data and maintain consistency among the collected predefined data.

The method can use a replication feature.

The method can use a plurality of common stylistic rules to enforce a common stylistic look and feel between webpages for the mobile computing device among an identified group of webpage creators.

The method can use a document processor to merge predefined data into a document template creating a webpage, and storing the webpage on an administrative data storage connected to an administrative processor.

The method can use a plurality of self-generating data entry screens to create a webpage specifically or a mobile computing device.

The method can use various computer instructions, such as computer instructions to convert a created webpage to a mobile version, computer instructions to transmit the mobile version for display on a mobile computing device, and computer instructions to maintain a mobile version of the webpage for use on a mobile computing device in the administrative data storage.

The term "active/passive database record locking feature" as used herein can refer to pessimistic/optimistic concurrency controls respectively. The webpage creator can specify which locking control to use for the webpage being created. When active locking is selected, the data records are locked on the retrieval of the data to display by the webpage created. If the lock is rejected, the webpage creator can define the webpage to show the data in inquiry only mode. If the lock fails, and the inquiry mode is selected, then the webpage is set to view only mode and the data is displayed and modifications are not allowed. If the lock fails, and the inquiry mode is not selected, then the webpage informs the user that the data is currently being modified by another user and who that user is. When passive mode is selected, the data records are retrieved and displayed on the webpage. When the user makes modifications to the data and requests the administrative process to save the changes, the administrative process tests to see that no changes to the data have been made since being retrieved using active locks. If the data has changed, then the update is rejected, otherwise the update is accepted.

The term "administrative processor" as used herein can refer to a computer. In embodiments, the term "administrative processor" can refer to a cloud based processor and/or a non-cloud based processor that can be configured to receive data via a network, which can include computer instructions for performing analytic computations and maintaining user profiles and corporate profiles for the development of webpages and mobile device specific webpages.

The term "administrative data storage" as used herein can refer to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals. The administrative data storage can contain various computer instructions to instruct the administrative processor to perform various tasks.

The term "calendar processor" as used herein can refer to a processor with a data storage containing computer instructions that instruct the processor to generate a calendar, a message, inter-user messages, or combinations thereof on the webpage. In embodiments, each user will be able to query an administrative processor to produce a calendar of events from previously entered data in the administrative processor while producing reminders of calendar events, as an alarm providing simultaneous notifications and scheduling.

The term "cold spare environment" as used herein can refer to a cold spare backup server with a cold spare data storage. The cold spare data storage can be updated in a time specified frequency, such as every 72 hours. The data files on the cold spare server can be received from an administrative data storage replication feature. This cold spare backup processor and cold spare data storage can hold data files in a "stale state". The cold spare backup processor can be used to inquiry processes off-loading the administrative data storage when the data required is not time sensitive. In embodiments, the cold spare environment can capture predefined data at developer user selected time intervals. It should be noted that when a hot spare environment is used, the hot spare environment can capture streaming real time data twenty-four hours a day and seven days a week.

The term "customizable cascading style sheet (CSS)" as used herein can refer to a plurality of computer instructions in the administrative data storage that in a predefined manner, define a look and feel of elements on a webpage for use on a mobile computing device or another computing device. The customizable cascading style sheet can be used for describing a presentation of the self-generated forms that the webpage creation system can automatically develop. The style sheet language can contain previously defined sections that have been determined by the plurality of common stylistic rules imposed by the webpage creation system. An example can be which font to use on a definition used in a data entry field label. The developer user can have access in one location to change the font, and the result can be that all field labels will reflect that change of font.

The term "developer user profile" as used herein can refer to a defined set of access rights and permissions in the administrative data storage given to a developer user ID by an administrative processor. The administrative processor can generate a set of access permissions that can allow the developer user ID to access rights of tools and predefined data for use in developing a webpage or a mobile device specific webpage, upon successful log in of the webpage creator, which can be a developer user or another user. For example, a junior developer can have access only to create a data entry screen definition, but not have access to modify any existing data entry screen definitions and a senior developer profile can have full access to all processes, such as to both create and modify both new and existing data entry screen definitions.

The term "document template" as used herein can refer to a document that can be generated by a processor, such as a WORD® document using computer instructions such as WORD® made by Microsoft stored in a data storage.

The term "document processor" as used herein can refer to computer instructions that can produce documents based on previously defined templates. Each document produced can include data fields stored in an administrative data storage. The document processor can enable a creator of a webpage or a mobile device specific webpage to replace tokens with data elements, such as to write words, store words, edit and navigate words on a webpage that previously had tokens in the template, which can be a string name.

The term "domain free interface traverser" as used herein can refer to computer instructions that transfer predefined data between third party servers connected via a network, wherein the predefined data can be based on user defined parameters from a user profile, and optionally, these computer instructions can enable the predefined data to transfer remotely between third party servers. The domain free interface traverser can control communication, data delivery and access permission to and from each third party server connected to the network while maintaining data integrity of all data processed for each third party server.

The term "dynamic information frame" as used herein can refer to a window that is inside the generated and surround the webpage. Each webpage can have at least 1 dynamic information frame on a webpage and is designed to allow an unlimited number of dynamic information frames on the webpage. In embodiments, the number of dynamic information frames can be limited by the browser being used on the mobile computing device. The dynamic information frames can be nested, increasing the number of dynamic information frames. Each dynamic information frame can contain a webpage generated by the webpage creation tool, a portable document format document, information from a third party server, a map or the like. The dynamic information frame can be created using computer instructions for forming the dynamic information frame stored in the administrative data storage.

The term "inquiry" as used herein can refer to a tool, like a search engine or similar device that via a network or direct connection, can pull data from an administrative data storage using particular webpage creator or mobile device specific webpage creator established criteria.

The term "integrity" as used herein can refer to having accurate and consistent data as of a specific date and time over its lifecycle.

The term "hot spare environment" as used herein can refer to a hot spare backup server with a hot spare data storage. The hot spare data storage can be updated as replication transactions are received from an administrative data storage replication feature. This hot spare backup server and hot spare data storage can be held in a stand-by mode to take over if the administrative data storage fails. The hot spare server can be used for inquiry processes off-loading the administrative data storage.

The term "hypertext generator" as used herein can refer to a set of programs running on an administrative server that interprets requests received from web users' browser devices. From the received request, an HTML response is generated, tailored according to the end users' device and sent back to the web users' browser program that made the request. Once the web users' browser receives the response, it then interprets the generated HTML code received rendering any new view and/or other actions specified for the device.

The term "mobile computing device" as used herein can refer to, but is not limited to, a laptop, a computer, a kiosk with a kiosk processor and a kiosk data storage, a tablet computer, a bar code reader, a hand held processor, a wearable computer, or another form of computer that can (i) receive and display information from a network, (ii) bi-directionally communicate and (iii) use a data storage and a display connected to the mobile computing device processor. The term "mobile computing device" as used herein can refer to a cellular phone, a smart phone, a smart watch, a wearable computer, or combinations thereof which have a processor, a data storage, a display and an ability to bi-directionally communicate with a network.

The term "multiple images" as used herein can refer to multiple photos, diagrams, digital logos, related images, and combinations thereof.

The term "nested relational database" as used herein can refer to a collection of tables containing rows and columns and at least one column will have a unique identifier for the table. The data can be stored in cells that have an attribute value, multiple attributes in a row are called tuples and multiple tuples in one table are referred to as a relation. The nested relational database allows a cell to contain another table.

The term "network" as used herein can refer to, but is not limited to, a global computer network, a local area network, a wide area network, a global communication system, a satellite network, a cellular network, the computing cloud, and combinations thereof.

The term "operating system" as used herein can refer to an operating system that the webpage creation system can use to simultaneously operate two different databases. In embodiments, the operating system can be a LINUX® operating system, a MICROSOFT WINDOWS® operating system or an IBM/AIX@ operating system.

The term "portable document format report template" as used herein can refer to a template stored in the administrative data storage.

The term "plurality of common stylistic rules" as used herein can refer to a set of rules that are created by a hypertext generator. The set of created common stylistic rules can then be stored in the data storage of the administrative processor for a particular project. For example, the common stylistic rules can make all screens for a particular project look similar in the representation to the many users. The common stylistic rules are different between mobile devices and other devices. The common stylistic rules can control a look on the screen, enabling all developer users to keep consistent "look and feel" on individual screens. This feature when followed, the feature of common stylistic rules, enables all users to consistently navigate all screens of all applications generated by the webpage creation system of this application without having to learn new navigation rules for each new application.

Examples of applied common stylistic rules can be seen in generated forms created from the predefined data which contain global processing actions that appear at the top of the screen in computing devices, and simultaneously in a hidden layer accessible with a touch on a mobile computing device. In embodiments, the common stylistic rules control menu placement, and all fields such as labels and input pairs in nested relational data views.

The term "pointer" as used herein can refer to an element controlled by a hand, stylus, or a mouse, which can allow for navigation between design pages of the webpage creation system as well as between elements on a generated webpage or a generated mobile device specific webpage. Any appearance, or design feature of the pointer, such as looking like a fish, or looking like a hand, can be controlled by a browser program of the user's client device.

The term "popup bubble" as used herein can refer to a hidden element that can contain data fields that can become visible when a user selects or clicks on a visual element to cause the hidden element to become visible. The popup bubble can enable navigation through grid elements (row and column elements) via "next" and "previous" buttons within the popup bubble. A "close" button and a "cancel" button within the popup bubble can be used to hide the now visible hidden element in two different ways. The "next" button can cause (i) entered data modifications to be applied to a row being displayed, and (ii) a user or a developer user to traverse forward through rows showing column data of a generated webpage or a generated mobile device specific webpage. The "previous" button can cause (i) entered data modifications to be applied to a row being displayed, and (ii) a user or a developer user to traverse backward through rows showing column data of a generated webpage or a generated mobile device specific webpage. The "close" button can cause a user or a developer user entered data changes to be applied to a generated webpage or a generated mobile device specific webpage and saved, and hide the now visible element to a row being displayed. The "cancel" button can cause proposed changes to a row being displayed to be disregarded and hide the now visible element.

The term "help bubble" as used herein can refer to a hidden area which can be shown once a pointer clicks on a help icon. The help bubble can contain information relating to the functionality of the embodiments, and/or the intended meaning and use of a field of data, dependent on the location of the help icon. In embodiments, the popup bubble can contain a help bubble or multiple help bubbles.

The term "predefined data" as used herein can refer to data identified using a webpage creator's or a mobile device specific webpage creator's defined parameters. Predefined data can be defined in a specific format from a third party server. Predefined data can contain multiple fields, or attributes, each attribute or field having been defined by a third party server. An example of this data can be a set of data records containing information about a person, such as a person's physical address and a person's phone contact information. Another example of predefined data can be a set of data representing codes used by the third party system, and the definition of each code. Another example of predefined data can be a set of data, which can contain file names for specified images and the corresponding image files, such as pictures. Still another example can be a set of digital documents, which can pertain to a specific event, for example, documents used in a legal litigation case. Another example can be data records that conform to a definition of fields agreed upon by multiple third party systems, which can be searched upon in a straight forward fashion, much like the Dewy Decimal System.

The term "replication feature" as used herein can refer to computer instructions in the administrative data storage that are configured to provide a redundant storage of predefined data among more than one server. The replication feature can provide a real time mirror of data files located on an administrative data storage server as replicated to other third party servers. The administrative server data files can be simultaneously replicated to multiple servers.

The term "required data entry field" as used herein can refer to a data entry field that a user or a developer user is required to enter before being allowed to save or modify a webpage or a mobile device specific webpage or data on the webpage or the mobile device specific webpage.

The term "self-generating data entry screen" as used herein can refer to computer instructions in the administrative data storage that instruct the administrative processor to generate an HTML form, with label and field entry pairs for the purpose of data entry. An example of a self-generating data entry screen can be the generation of a data entry screen, which tracks vendor information, such as a vendor name and telephone number, and related information such as customer names and purchasing histories for those customers related to the vendor.

The term "sliding carousel function" as used herein can refer to computer instructions in the administrative data storage that generate an "image container" on the self-generating data entry screens that enable display of multiple image files input by a developer user or a user, one image at a time. The images can be a plurality of graphic images, either digital or analog, such as photographs, video, a portable document format, a spread sheet, a text message, or an email. In embodiments, the sliding carousel function can enable controlled viewing of multiple images simultaneously on the webpage or the mobile device specific webpage generated by the webpage creation system for at least one mobile computing device in a compact sequentially scrolling display. There are at least three different ways to navigate this function through each image file, (1) click a desired image in a row of images that is displayed above a currently displayed image, (2) click on one of a pair of directional arrows displayed overlaying a currently displayed image, the arrows indicating direction of image movement, such as right to left or left to right (also known as back to front); and (3) a swipe using a finger or a stylus on a currently displayed image, the swipe moving in the direction a user would like to view the images of the sliding carousel function.

The term "third party server" as used herein can refer to a plurality of computers with processors and data storages, which can be connected to the network and in communication with the administrative processor.

The term "transfer mechanism" as used herein can refer to computer instructions configured to transfer webpages or mobile device specific webpages between the administrative processor to third party servers, which can be connected to the network for access by the at least one mobile computing device. In embodiments, the transfer mechanism can be stored in administrative data storage for access by an administrative processor enabling transfer of the webpage or the mobile device specific webpage to another administrative processor connected to the network using a developer user profile or a user profile.

The term "user" as used herein can refer to a person, such as a non-administrative user, or a user that is not a webpage developer, or a mobile device specific webpage developer that is the operator of a webpage or a mobile device specific webpage generated by the webpage creation system. In embodiments, the user can be a webpage creator.

The term "user profile" as used herein can refer any known profile in the industry, such as a user profile, a developer user profile, user profiles, and corporate profiles, which can include a user name, as tied to access and privileges to sections of the administrative data storage as defined by developer users.

The terms "webpage creator or mobile device specific webpage creator" as used herein can refer to an author, such as person or a computer, charged with creating a webpage or a mobile device specific webpage using predefined data from multiple third party servers.

The terms "webpage and mobile device specific webpage" as used herein can refer to a final product usable on mobile computing devices and other devices connected to the network created by the webpage creation system and the webpage creator or the mobile device specific webpage creator written in a hypertext markup language HTML.

Turning now to the Figures, FIG. 1 depicts an overview of components usable with the method according to one or more embodiments.

The method can use a webpage creation system 2 to create webpages for at least one mobile computing device 22a and 22b connected to a network 11.

In embodiments, the method can use an administrative processor 10, which can be in communication with the network 11 and can further be in communication with an administrative data storage 12.

The administrative processor 10 can communicate with a first third party server 31a containing predefined data 19a and a second third party server 31b containing predefined data 19b. The first and second third party servers can connect to the network 11.

In embodiments, a hot spare environment 172b and a cold spare environment 173b can be in communication with the network 11.

The at least one mobile computing device 22a and 22b can access webpages created with the method. Each mobile computing device can be operated by a user 17a and 17b. Each mobile computing device can access the webpage creation system 2 for viewing a product produced using the webpage creation system 2. In embodiments, the webpage creation system 2 can be accessed from a computer, such as a laptop, a tablet computer or a standalone computer.

Each mobile computing device 22a and 22b is shown with a webpage 20a and 20b respectively.

The method can enable each created webpage 20a and 20b for the at least one mobile device to be navigated using a pointer 206a and 206b.

When a user 17a or 17b uses the pointer 206a or 206b, information in the form of one or more of popup bubbles 208a and 208b can appear on the webpage.

When the user 17a or 17b uses the pointer 206a or 206b and clicks or selects a help icon, help text can be shown in one or more help bubbles 209a and 209b.

In embodiments, a computing cloud 33 for communication with the network 11 can be used. In embodiments, the computing cloud can contain a plurality of processors and data storages, which are non-transitory computer readable media, connected together, according to known definitions of a computing cloud.

Figure 2B:
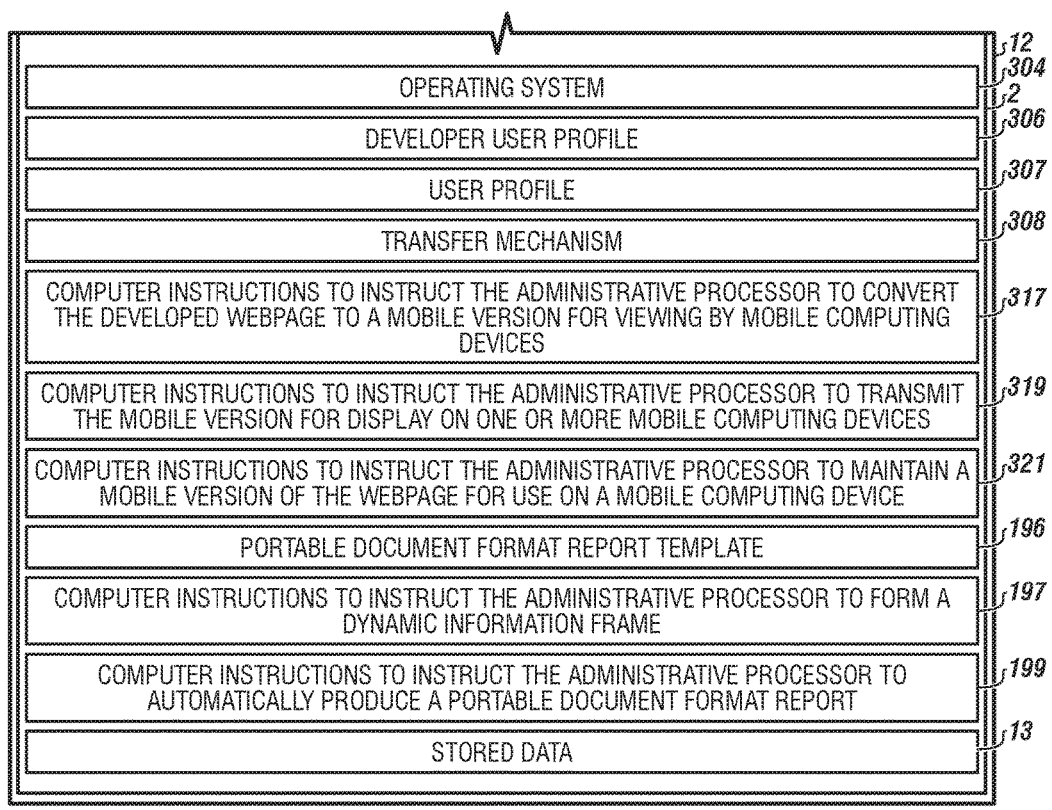

FIGS. 2A and 2B depict an administrative data storage usable with the method.

The method can use the webpage creation system 2, which can have the administrative data storage 12. The administrative data storage can contain stored data 13 and at least one mobile device specific webpage document template 15. In embodiments, the stored data 13 can be usable by a webpage creator and inserted into the mobile device specific webpage document template 15.

The administrative data storage can contain computer instructions to instruct the administrative processor to search for and collect predefined data 19c, which can be collected from third party websites connected to the network. The collected predefined data can be stored in the administrative data storage.

Stored data 13 and the predefined data 19a can be installed into the mobile device specific webpage document template 15 to form at least one mobile device specific webpage 20, which can be stored in the administrative data storage 12.

The method can use a plurality of self-generating data entry screens 99 to create the mobile device specific webpage 20. The plurality of self-generating data entry screens 99 can be stored in the administrative data storage.

The plurality of self-generating data entry screens 99 can instruct the administrative processor to create at least one mobile device specific webpage 20 using the mobile device specific webpage document template 15 which can be identified from a list of mobile computing devices and their specifications 88 and merging predefined data 19c in real time using user selected predefined parameters, such as a cascading style sheet.

In embodiments, the administrative data storage can contain computer instructions 89 to instruct the administrative processor to identify a specific mobile computing device for a mobile device specific webpage.

To create the mobile device specific webpage 20, the method can utilize a hypertext generator 100, which can be stored in the administrative data storage 12 that can further instruct the administrative processor to generate automatically, hypertext from input.

The method can use a domain free interface traverser 102 in the administrative data storage 12 to instruct the administrative processor to simultaneously: collect the predefined data 19c from at least one of the third party servers to the administrative data storage 12 via the network, store the collected predefined data 19c in the administrative data storage 12, and maintain consistency among the collected predefined data 19c.

In embodiments, the method can use a replication feature 104 in the administrative data storage to instruct the administrative processor to maintain integrity of the predefined data 19c and to prevent loss of the predefined data 19c as the predefined data 19c moves between third party servers or between a third party server and the network of the computing cloud, while simultaneously duplicating data to a secondary site, which can be the hot spare environment, the cold spare environment or both the hot spare environment and the cold spare environment.

The method can use computer instructions 171 to connect to a hot spare environment to capture streaming real time data.

The method can use computer instructions 175 to connect to a cold spare environment to capture predefined data at a user selected unit of time. An example of a user selected unit of time can be a certain time on a certain day of the week, such as every Tuesday at 2 pm, or at any interval to be determined by the user.

The method can include computer instructions 177 to form a search screen in the administrative data storage. The formed search screen 105 can be stored in the administrative data storage.

In embodiments, the search screen 105 can be configured with a look and feel identical to at least one of the self-generating data entry screens 99.

The search screen 105 can include a static display of images feature 115, a sliding carousel display of images feature 116, and a customizable element positioning feature 117 for unique location of an element on the mobile device specific webpage 20 as defined by at least one webpage creator.

In embodiments, a plurality of common stylistic rules 106 can be stored in the administrative data storage 12 to instruct the administrative processor to enforce a common stylistic look and feel between webpages developed for the at least one mobile computing device or multiple mobile computer devices among an identified group of webpage creators.

The common stylistic rules 106 can include a customizable cascading style sheet (CSS) 107.

The method can include a document processor 108 in the administrative data storage to instruct the administrative processor to merge the predefined data 19c into the mobile device specific webpage document template 15 in real time to start creation of the at least one mobile device specific webpage 20, and then store the merged mobile device specific webpage document 15 with the predefined data 19c as the mobile device specific webpage 20 in the administrative data storage 12.

In embodiments, the plurality of the self-generating data entry screens 99 can access simultaneously: the hypertext generator 100, the domain free interface traverser 102, the replication feature 104, the plurality of common stylistic rules 106, and the document processor 108.

The method can use a calendar processor 110 in the administrative data storage to instruct the administrative processor to produce a calendar on the mobile computing device webpage.

The method can use an active/passive database record locking feature 200 in the administrative data storage 12 for instructing the administrative processor to control access to and to modify the predefined data 19c in a way that maintains the integrity of the predefined data 19c.

The method can use a sliding carousel function 202 in the administrative data storage 12 for instructing the administrative processor to control viewing of multiple images simultaneously on the webpage of the mobile computing device in a compact, sequentially scrolling, display.

The method can use an automatic help feature 204 in the administrative data storage 12 configured to serve as an aid to a webpage creator or a user.

In embodiments, the automatic help feature 204 can enable the pointer operated by the webpage creator, or by the user of the mobile computing device to touch or link to an element on the webpage being created for the mobile computing device or being used on the mobile computing device. In embodiments, the pointer can be used to extract the predefined data 19c and display the predefined data 19c in one or more popup bubbles.

The method can provide a nested relational data base 302 in the administrative data storage 12 for access by the administrative processor for developing the webpage by the webpage creator.

The method can use an operating system 304 in the administrative data storage for access by the administrative processor enabling the webpage creator to develop the mobile device specific webpage 20.

The administrative data storage 12 can use the webpage creation tool 2 to form a developer user profile 306 for each webpage creator, and store the developer user profile 306 in the administrative data storage 12 for access by the administrative processor for use in developing the mobile device specific webpage 20.

The administrative data storage 12 can use the webpage creation tool 2 to form a user profile 307 for each user of a created mobile device specific webpage and store the user profile in the administrative data storage 12 for access.

The method can use a transfer mechanism 308 in the administrative data storage for access by the administrative processor.

In embodiments, the transfer mechanism 308 can include computer instructions configured to instruct the administrative processor to transfer webpages between the administrative processor to third party servers, which can be connected to the network.

The administrative data storage 12 can use computer instructions 317 to instruct the administrative processor to convert the developed webpage to a mobile version for viewing by mobile computing devices.

The administrative data storage 12 can use computer instructions 319 to instruct the administrative processor to transmit the mobile version for display on one or more mobile computing devices.

The administrative data storage 12 can use computer instructions 321 to instruct the administrative processor to maintain a mobile version of the webpage for use on a mobile computing device.

The administrative data storage 12 can have computer instructions 197 to instruct the administrative processor to form a dynamic information frame.

The administrative data storage 12 can have a portable document format report template 196 for automatic population of the predefined data 19c into the portable document format report template 196, which can use computer instructions 199 in the administrative data storage 12 to automatically produce a portable document format report.

Figure 3:
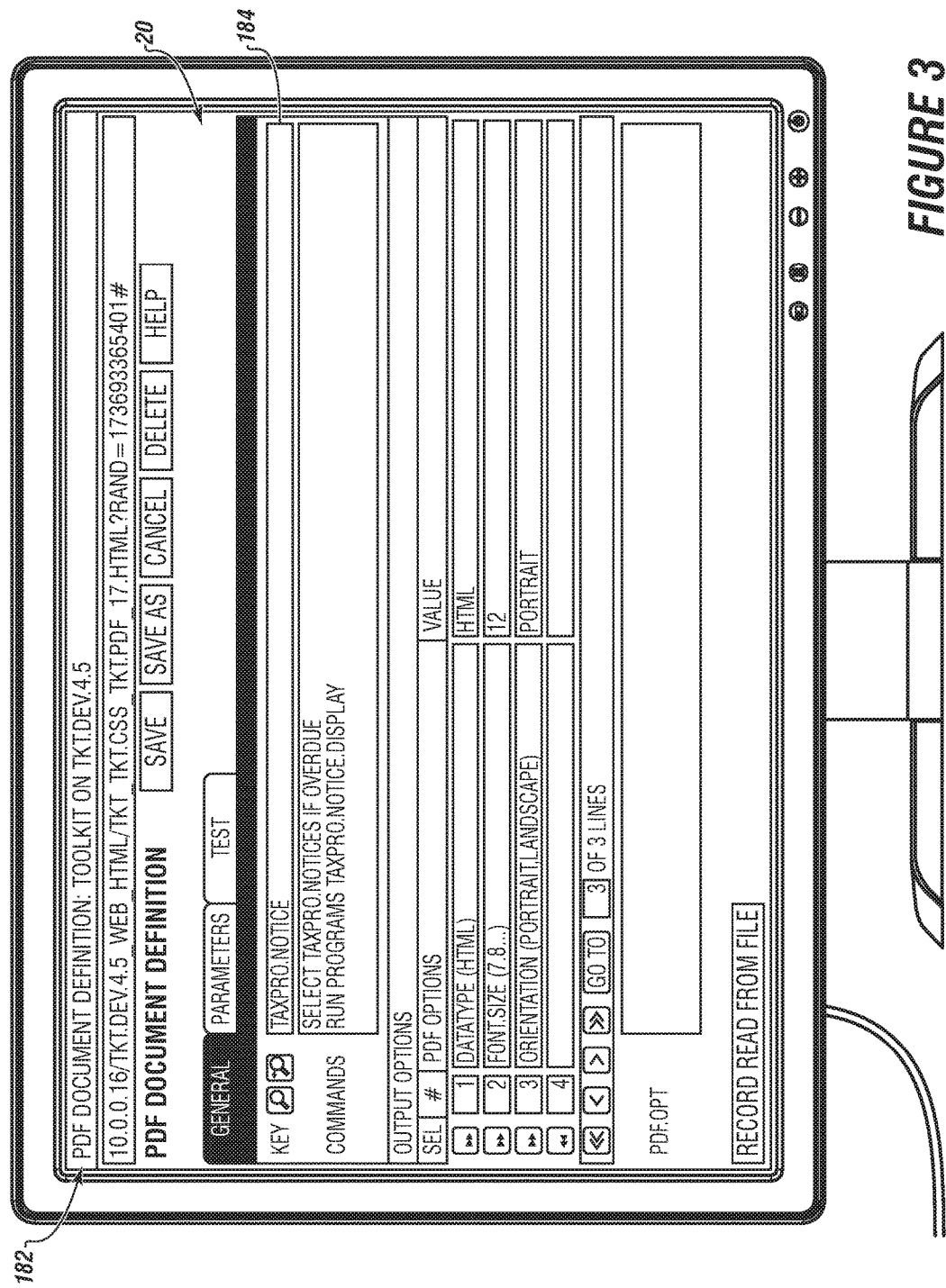
FIG. 3 depicts a webpage developed with the method according to one or more embodiments.

FIG. 3 depicts a webpage developed with the method according to one or more embodiments.

The at least one mobile device specific webpage 20 is shown within a dynamic information frame 182, which can be configured as a web window within a web window, wherein each web window can contain different self-generated data entry screens.

The at least one mobile device specific webpage 20 is shown with at least one required data entry field 184 as defined by a developer user or a user.

Figure 4:
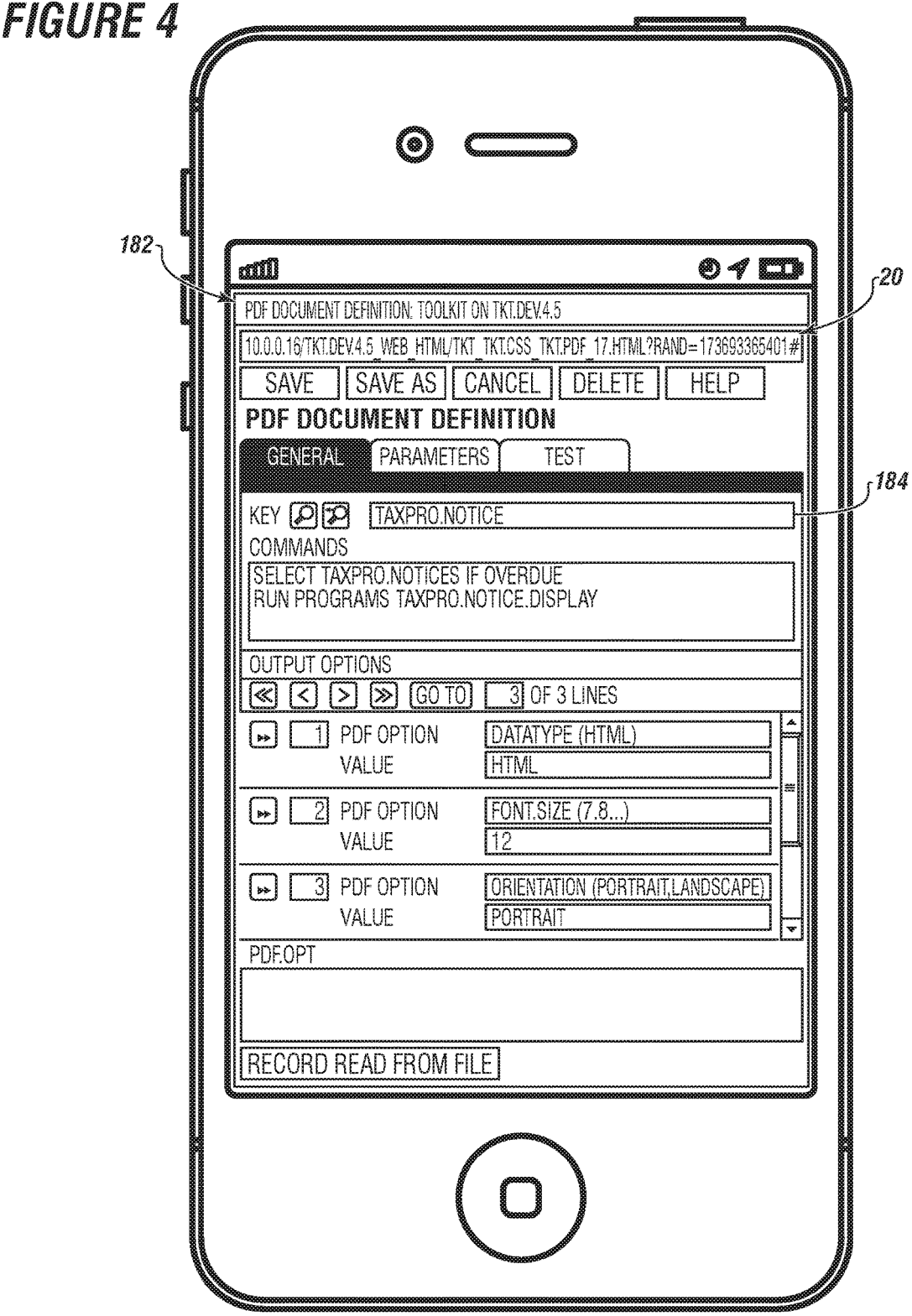
FIG. 4 depicts a mobile computing device webpage developed with the method according to one or more embodiments.

FIG. 4 depicts a mobile computing device webpage developed with the method according to one or more embodiments.

The at least one mobile device specific webpage 20 is shown within the dynamic information frame 182, which can be configured as a web window within a web window.

The at least one mobile device specific webpage 20 is shown with at least one required data entry field 184 as defined by a developer user or a user.

As an example, one of the local police officers of the Houston Police Department with no webpage training or skills, named Bob is one of several webpage creators for the Houston Police Department and with his laptop computer can log into the administrative processor.

Bob requests one of the self-generating data entry screens that was already created and stored in the administrative data storage by the head information technology department of the Houston Police Department.

Bob uses the self-generating data entry screen and the document processor to activate the hypertext generator to create a mobile device specific webpage about runaways in Houston from the age range 13-16 using the webpage document template in the administrative data storage enabling other officers to access and use the website immediately using the customized style sheet input into the administrative data storage.

Bob relies on one of the plurality of common stylistic rules of the cascading style sheet in the administrative data storage to instruct the administrative processor to enforce a common stylistic look and feel between webpages for the mobile computing device that first identify girls and then identify boys that are runaways.

The webpage for the mobile computing device in progress can connect to the domain free interface traverser to collect predefined data, information from other law enforcement websites or third party servers on the network, simultaneously. The method can collect and simultaneously maintain integrity between the collected data, such as a girl name Mary Sue Button age 16, missing from California and last seen in Houston, Tex. in April 2016 and is not confused with Mary Button Sue age 14 who is was a resident of Houston and last seen in Arkansas.

Bob relies on the replication feature of the method to not lose the predefined data as the predefined data moves between the third party servers and Bob's computer, as an example, the replication can be an automatic "save as" for the predefined data changed by Bob's computer.

Bob can test the developed webpage by logging into a mobile computing device and viewing the completed webpage seeing that it presents the collected data from the different sites with the standardized look and feel that was predetermined by the head of information technology department of the Houston Police Department.

FIG. 5 is an exemplary filled in portable document format report template according to one or more embodiments.

In this embodiment, the portable document format report template 196 is shown here as a tax bill for automatic population of predefined data 19 into the portable document format report template which use computer instructions in the administrative data to automatically produce the portable document format report.

The portable document format report template 196 can have information and elements, such as element 202, shown here as real or personal property parcel number 1234, element 204, shown here as address 1: 123 Simple Street, element 206, shown here as address 2: suite 12, element 208, shown here as city: Austin, element 210 shown here as state: Texas, and element 212, shown here as zip code: 78701.

FIGS. 6A and 6B depicts steps of the method according to one or more embodiments.

The method for accelerated development of a mobile device specific webpage for at least one mobile computing device can include a variety of steps and functions, but are not limited to nor shown in any defined order.

The method can include forming a plurality of data entry screen definitions for a mobile device specific webpage using an administrative processor and storing the data entry screen definitions in an administrative data storage, as illustrated in box 500.

The method can include generating a list of mobile computing devices and specifications for displaying a created mobile device specific webpage and storing the list in the administrative data storage, as illustrated in box 510.

The method can include identifying a specific mobile computing device for the mobile device specific webpage from the list of mobile computing devices, as illustrated in box 520.

The method can include automatically generating data entry screens for entering and storing predefined data for use on the mobile device specific webpage and storing the data entry screens in the administrative data storage, as illustrated in box 530.

In embodiments, the predefined data can be at least one of: digital content, digital images, and analog information, or combinations thereof. The digital content, digital images and analog information can each be retrievable and accessible by an inquiry.

The method can include automatically generating hypertext for the mobile device specific webpage using the predefined data, as illustrated in box 540.

The method can include bidirectionally controlling communication, data delivery and access permission, to and from one or more third party servers connected to the network to automatically collect, store and maintain data integrity of data processed for each third party server and maintain consistency of the predefined data collected from the one or more third party servers using the network, collecting the predefined data via the mobile device specific webpage from the one or more third party servers on the network, and updating the predefined data via the mobile device specific webpage to the one or more third party servers on the network simultaneously, as illustrated in box 550.

The method can include simultaneously duplicating the predefined data to a hot spare environment and a cold spare environment while maintaining integrity of the predefined data to prevent loss of the predefined data, as illustrated in box 560.

In embodiments, the hot spare environment can capture streaming real time data, such as twenty-four hours a day and seven days a week and the cold spare environment can capture the predefined data at a user's or a non-administrative user's selected time intervals.

The method can include enforcing a common stylistic look and feel for use on the mobile device specific webpage and maintaining consistency between additionally developed mobile device specific webpages for the specific mobile computing device using a plurality of common stylistic rules, as illustrated in box 570.

The method can include merging the predefined data into the mobile device specific webpage document template automatically and generating the mobile device specific webpage for the specific mobile computing device while storing the generated mobile device specific webpage in the administrative data storage enabling a user or a non-administrative user to create the mobile device specific webpage filled with the predefined data with self-generating data entry screen definitions using the plurality of common stylistic rules, as illustrated in box 580.

The method can include transmitting the generated mobile device specific webpage via the network for display on the specific mobile computing device, as illustrated in box 590.

The method can include producing a calendar on the mobile device specific webpage, as illustrated in box 600.

The method can include installing a nested relational database in the administrative data storage for access by the administrative processor for developing the mobile device specific webpage for the at least one mobile computing device, as illustrated in box 602.

The method can include installing an operating system in the administrative data storage for access by the administrative processor for developing the mobile device specific webpage for the at least one mobile computing device, as illustrated in box 604.

The method can include installing a developer user profile in the administrative data storage for access by the administrative processor for developing the mobile device specific webpage for the at least one mobile computing device, as illustrated in box 606.

The method can include installing a transfer mechanism in the administrative data storage for access by the administrative processor enabling transfer of the mobile device specific webpage to another administrative processor connected to the network using the developer user profile or a user profile of a non-administrative user, as illustrated in box 608.

The method can include installing an active/passive database record locking feature in the administrative data storage for instructing the administrative processor to control access to modify the predefined data to maintain predefined data integrity, as illustrated in box 610.

The method can include controlling a viewing of multiple images simultaneously on the mobile device specific webpage generated by the webpage creation method for the at least one mobile computing device in a compact sequentially scrolling display, as illustrated in box 612.

The method can include providing an aid to a mobile device specific webpage creator, enabling a non-administrative user of the at least one mobile computing device to operate a pointer to touch or link to an element on the mobile device specific webpage, extract the predefined data, and display the predefined data in a help bubble on the mobile device specific webpage of the at least one mobile computing device, as illustrated in box 614.

The method can include presenting a search screen configured with a look and feel identical to at least one of the plurality of self-generating data entry screens, by providing a static display of images feature and a sliding carousel display of images feature, as illustrated in box 616.

The method can include using a customizable cascading style sheet in the administrative data storage for use with the plurality of common stylistic rules, as illustrated in box 618.

The method can include installing a dynamic information frame configured as a web window within a web window, wherein each web window can contain different self-generated data entry screens, as illustrated in box 620.

The method can include installing a portable document format report template for automatic population of the predefined data into the portable document format report template automatically producing a portable document format report comprising information and elements, as illustrated in box 622.

The method can include using a hypertext generator with the plurality of data entry screen definitions to generate the plurality of self-generating data entry screens with the predefined data, as illustrated in box 624.

In embodiments, the dynamic information frame can be a static creation or a dynamic creation on the mobile device specific webp age.

In embodiments, at least one required data entry field can be defined by a non-administrative user.

In embodiments, multiple webpages can be developed and linked together using the method.

In embodiments, the method can use the administrative processor and the administrative data storage in the computing cloud.

While these embodiments have been described with emphasis on the embodiments, it should be understood that within the scope of the appended claims, the embodiments might be practiced other than as specifically described herein.

What is claimed is:

1. A method for accelerated development of a mobile device specific webp age for at least one mobile computing device comprising:
   a) forming a plurality of data entry screen definitions for the mobile device specific webpage using an administrative processor and storing the plurality of data entry screen definitions in an administrative data storage;
   b) generating a list of mobile computing devices and specifications for displaying a created mobile device specific webpage and storing the list of mobile computing devices and specifications in the administrative data storage;
   c) identifying a specific mobile computing device for the mobile device specific webpage from the list of mobile computing devices and specifications;
   d) automatically generating a plurality of self-generating data entry screens for entering and storing predefined data for use on the mobile device specific webpage and storing the plurality of self-generating data entry screens in the administrative data storage;
   e) automatically generating hypertext for the mobile device specific webpage using the predefined data;
   f) bidirectionally controlling communication, data delivery and access permission, to and from one or more third party servers connected to a network to automatically collect, store and maintain data integrity of data processed for the one or more third party servers and maintain consistency of the predefined data collected from the one or more third party servers using the network, collecting the predefined data via the mobile device specific webpage from the one or more third party servers on the network, and updating the predefined data via the mobile device specific webpage to the one or more third party servers on the network simultaneously;
   g) simultaneously duplicating the predefined data to a hot spare environment and a cold spare environment while maintaining integrity of the predefined data preventing loss of the predefined data;
   h) enforcing a common stylistic look and feel for use on the mobile device specific webpage and maintaining consistency between additionally developed mobile device specific webpages for the specific mobile computing device using a plurality of common stylistic rules;
   i) merging the predefined data into a mobile device specific webpage document template automatically and generating the mobile device specific webpage for the specific mobile computing device while storing the generated mobile device specific webpage in the administrative data storage enabling a user or a non-administrative user to create the mobile device specific webpage filled with the predefined data with the plurality of self-generating data entry screen definitions using the plurality of common stylistic rules; and
   j) transmitting the generated mobile device specific webpage via the network for display on the specific mobile computing device.

2. The method of claim 1, further comprising producing a calendar on the mobile device specific webpage.

3. The method of claim 1, wherein the administrative processor and the administrative data storage are part of a computing cloud.

4. The method of claim 1, wherein the network comprises at least one of: a global computer network, a local area network, a wide area network, a global communication system, a satellite network, a cellular network, a computing cloud, or combinations thereof.

5. The method of claim 1, wherein the predefined data comprises at least one of: digital content, digital images, and analog information, wherein the digital content, the digital images and the analog information are retrievable and accessible by an inquiry.

6. The method of claim 1, comprising:
   a) installing a nested relational database in the administrative data storage for access by the administrative processor for developing the mobile device specific webpage for the at least one mobile computing device;
   b) installing an operating system in the administrative data storage for access by the administrative processor for developing the mobile device specific webpage for the at least one mobile computing device;
   c) installing a developer user profile, a user profile, or both the developer user profile and the user profile in the administrative data storage for access by the administrative processor for developing the mobile device specific webpage for the at least one mobile computing device; and
   d) installing a transfer mechanism in the administrative data storage for access by the administrative processor enabling transfer of the mobile device specific webpage to another administrative processor connected to the network using the developer user profile or the user profile of the user or the non-administrative user.

7. The method of claim 1, comprising installing an active/passive database record locking feature in the administrative data storage for instructing the administrative processor to control access to modify the predefined data to maintain predefined data integrity.

8. The method of claim 1, comprising controlling a viewing of multiple images simultaneously on the mobile device specific webpage generated by a webpage creation system for the at least one mobile computing device in a compact sequentially scrolling display.

9. The method of claim 1, comprising providing an aid to a mobile device specific webpage creator, enabling the user or the non-administrative user of the at least one mobile computing device to operate a pointer to touch or link to an element on the mobile device specific webpage, extract the predefined data, and display the predefined data in a help bubble on the mobile device specific webpage of the at least one mobile computing device.

10. The method of claim 1, comprising presenting a search screen configured with a look and feel identical to at least one of the plurality of self-generating data entry screens, by providing a static display of image feature and a sliding carousel display of images feature.

11. The method of claim 1, comprising using a customizable cascading style sheet in the administrative data storage for use with the plurality of common stylistic rules.

12. The method of claim 1, wherein the hot spare environment captures streaming real time data and the cold spare environment captures the predefined data at the user's or the non-administrative user's selected time intervals.

13. The method of claim 1, comprising installing a dynamic information frame configured as a web window within a web window, wherein each web window contains different self-generated data entry screens.

14. The method of claim 13, wherein the dynamic information frame is a static creation or a dynamic creation on the mobile device specific webpage.

15. The method of claim 1, comprising at least one required data entry field as defined by the user of the non-administrative user.

16. The method of claim 1, comprising installing a portable document format report template for automatic population of the predefined data into the portable document format report template automatically producing a portable document format report comprising information and elements.

17. The method of claim 1, comprising using a hypertext generator with the plurality of data entry screen definitions to generate the plurality of self-generating data entry screens with the predefined data.

* * * * *